April 9, 1963

J. T. WENTWORTH 3,084,539

SYSTEMS FOR DETERMINING FUEL CONSUMPTION
OF INTERNAL COMBUSTION VEHICLE ENGINES

Filed March 24, 1958

INVENTOR.
Joseph T. Wentworth
BY
J. W. Lovett
ATTORNEY

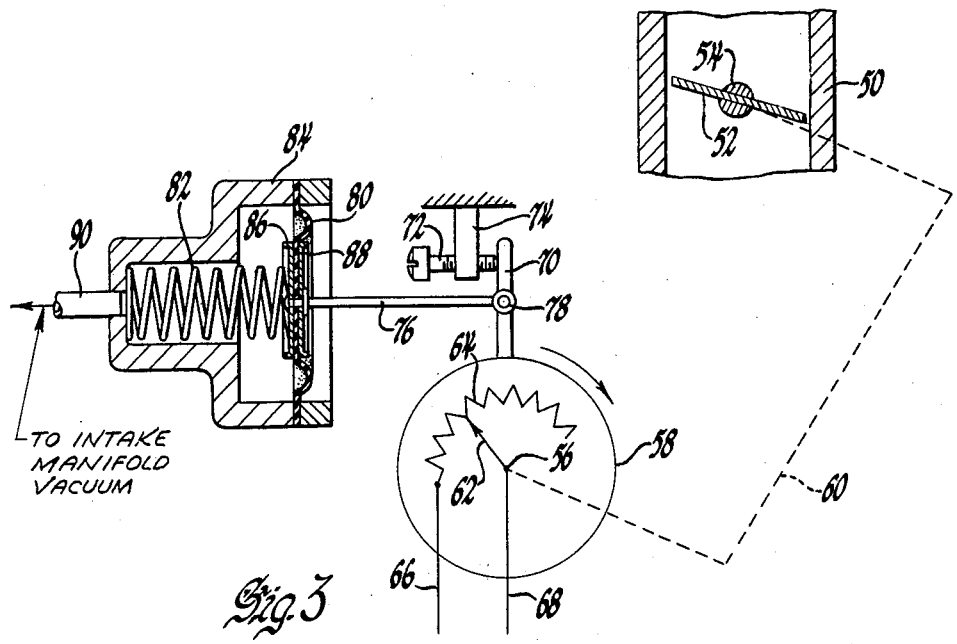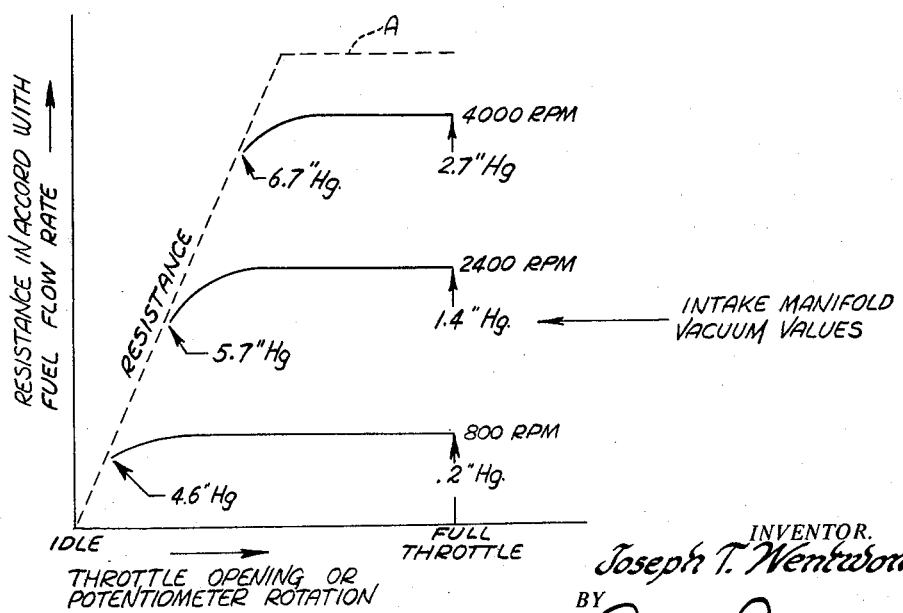

United States Patent Office 3,084,539
Patented Apr. 9, 1963

3,084,539
SYSTEMS FOR DETERMINING FUEL CONSUMPTION OF INTERNAL COMBUSTION VEHICLE ENGINES
Joseph T. Wentworth, Royal Oak, Mich., assignor to General Motors Corporation, Detroit, Mich., a corporation of Delaware
Filed Mar. 24, 1958, Ser. No. 723,594
2 Claims. (Cl. 73—114)

This invention relates to systems for determining distance per unit of fuel consumption and more particularly to systems indicating instantaneously and automatically the ratio of car speed with respect to fuel consumption rate of internal combustion engines for propelling vehicles.

A need has arisen, particularly in the automotive field, for a low cost system whereby fuel economy or fuel mileage in terms such as miles per gallon may be indicated with regard to a spark ignition, internal combustion engine, whether it be of the unit fuel induction type or the more conventional carbureted type. Such a system need not be as accurate as a laboratory instrument, but it should be reasonably accurate quite satisfactorily to serve as an automobile accessory to give an operator, at a glance, the approximate fuel mileage under the conditions obtaining.

To this end, an object of the present invention is to provide a system of low cost and simplified construction which is capable of indicating, at a glance, the approximate distance being traveled per unit of fuel being consumed by an internal combustion type of vehicle engine.

A feature of the present invention is a system in which the throttle angle or position is utilized to determine a resistance in a circuit the current of which is generated at a voltage corresponding with vehicle speed and the current flow is an indication of fuel mileage in terms of distance traveled per unit of fuel. Another feature is a system having an electrical circuit with a current generated having a voltage corresponding to vehicle speed and a rheostat in the circuit with its resistance dependent upon engine throttle position or angle and preferably, but not necessarily, also dependent upon the intake manifold vacuum of an internal combustion type engine under high load. Another feature is a system wherein a lost motion device is incorporated more accurately to determine a rheostat resistance corresponding with fuel consumption at high engine load.

These and other important features of the invention will now be described in detail in the specification and then pointed out more particularly in the appended claims.

In the drawings:

FIG. 3 is a diagrammatic representation of a modified arrangement involving an engine throttle valve mechanically linked with a rheostat, and the latter being associated with a diaphragm and spring actuated device controlled by the vacuum existent in an intake manifold of the engine;

Figure 4:
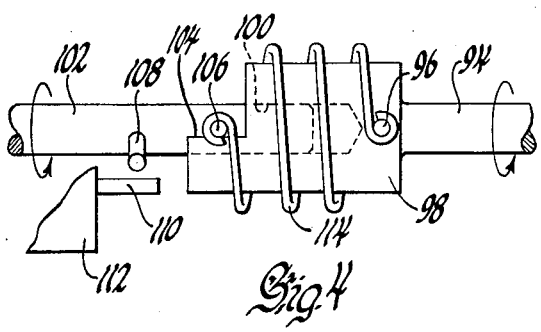

FIG. 4 presents one form of lost-motion device which may be employed; and

FIG. 5 represents theoretical curves obtained for a given engine by plotting fuel flow rate or rheostat resistance against the throttle opening or throttle angle and with reference to intake manifold vacuum.

Figure 1:
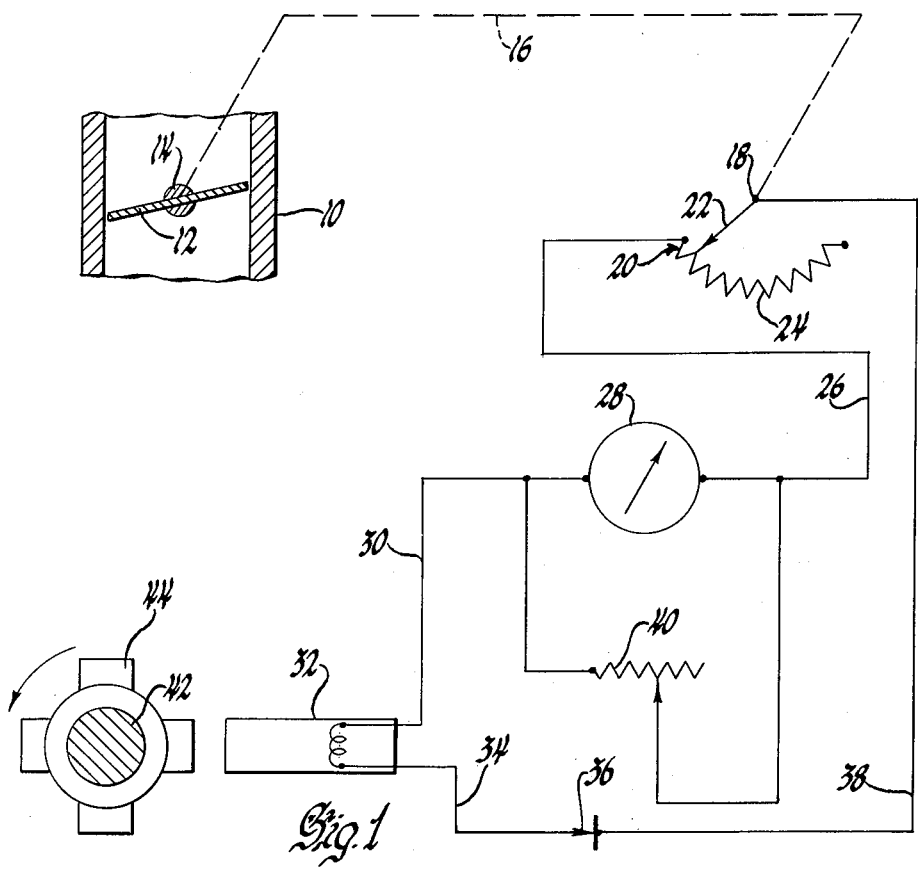
FIG. 1 is a diagrammatic representation of a system including the throttle valve of an internal combustion type engine, a voltage generator, a rheostat, a gauge, and circuitry as an embodiment of the present invention.

In FIG. 1 a conduit 10 leading from a carburetor is shown and in which a throttle valve 12 is pivotally mounted as is customary in controlling the flow of a gasoline-air mixture to an engine. A mechanical linkage 16 is illustrated by dash lines and connects the throttle shaft 14 to a rotatable shaft 18 of a rheostat generally indicated at 20. The shaft 18 is provided with a contact arm 22 which is insulated from the linkage 16 and has one end in sliding contact with an arcuate resistance 24. One end of the latter is connected by a line 26 to a gauge 28 in the form of a direct current microammeter having a dial and pointer. The dial bears a scale in terms of distance per unit of fuel such as miles per gallon of gasoline. The other side of the gauge 28 is connected by a line 30 to the coil of a magnetic pickup 32 which in turn is connected by a line 34 to a germanium diode rectifier 36. Current passing through the latter is led by a line 38 to the arm 22 of the rheostat. An adjustable shunt resistance 40 is connected around the gauge or meter 28. A universal joint drive shaft 42 is arranged to be driven by the engine and the pickup 32 is relatively so placed that the passage of each knob 44 will cause a voltage impulse to be generated. The rectified voltage is very nearly a linear function of the speed of the shaft 42; i.e., the speed of the vehicle.

In order to determine that a resistance proportional to and contemporaneous with fuel flow may be obtained, fuel flow rate has been plotted against throttle angle for various vehicle speeds and for several different Otto-cycle type engines. A representative curve is given in FIG. 2 for a given engine and up to full load at each of three engine speeds. An automobile usually operates at below 80 percent load; and, when so run, the plotted results (as in FIG. 2) show that the fuel rate for a given engine may be approximated by a single curve. The plot of resistance of the resistance 24 against angular rotation is made to coincide with this single curve and, as a result, the shaft 18 and the throttle shaft 14 may be coupled together as in FIG. 1 by the linkage 16 giving a resistance in the rheostat 20 approximately proportional to fuel flow rate and in accordance with the corresponding throttle angle.

Basically, the system operates in accordance with Ohm's law or $I = E/R$. With voltage, E, proportional to car speed and a resistance, R, proportional to fuel flow, the current, I, is proportional to the quantity sought. This quantity may be expressed in an instantaneous value of miles per gallon to be read directly from the meter 28. The meter continuously indicates the instantaneous fuel mileage of the vehicle, closely following changing driving conditions as they are encountered. Calibration of the meter 28 may be had by adjustment of the shunt resistance 40.

Figure 2:
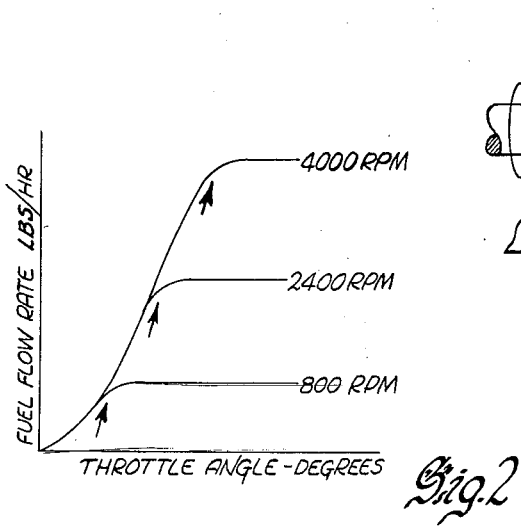
FIG. 2 represents a curve of fuel flow rate plotted against throttle angle in the case of a given engine.

Errors do arise in the operation of the system in its simplified version as described above. Such errors may be ignored as they principally apply when the engine load is in excess of 80 percent of the engine capacity—a condition which is not customary in ordinary driving. In FIG. 2, the curves at 2400 r.p.m. and at 800 r.p.m. depart from the single curve when engine load exceeds 80 percent. However, if a refinement is desired, compensation for high engine load conditions may be made by utilizing or adding the arrangement depicted in FIG. 3 which employs a carburetor conduit 50 in which flow passage is pivoted a throttle valve 52 having a shaft 54. This shaft is connected to a shaft 56 in a rheostat 58 by a mechanical linkage 60 by means of which the valve 52 and a rheostat contact arm 62 may be turned simultaneously and correspondingly. An arcuate resistance 64 in the rheostat is connected at one end to a line 66 in turn connected to a meter circuit in the same way as in the case of line 26 in FIG. 1. The pivot end of the arm 62 is also connected to that circuit by a line 68 as in the case of line 38. The body of the rheostat 58 and including the resistance 64 is rotatable about the shaft 56. Its rotation in a counter-clockwise direction is limited by an extension 70 contacting the end of a stop screw 72 supported by a stationary bracket 74. A rod 76 is pivoted at 78 to an intermediate portion of the extension. The other end of the rod is fixed to a diaphragm 80 to move therewith as dictated by a spring 82 and the extent of vacuum in the engine intake manifold. The diaphragm is supported in a cup member 84 and is reinforced by two discs 86 and 88 which are fixed to the rod 76. The spring 82 acts against the disc 86 resiliently to urge the diaphragm to the right. A conduit 90 connects the cup member 84 to the engine intake manifold.

The curves of FIG. 5 supplement those of FIG. 2 in serving to explain the basis upon which the modification of FIG. 3 operates. The dotted and upwardly inclined straight line represents, in approximation, the rheostat resistance in accord with fuel flow rate as determined by the throttle angle and as plotted against throttle opening or rheostat rotation. This line is approximately correct if the engine load does not exceed 80 percent under which conditions the engine intake vacuum is in the neighborhood of five inches of mercury. The constant speed lines labeled 800, 2400 and 4000 r.p.m. do not deviate from the straight line until a given plateau is reached at each speed and at full throttle opening the intake vacuum for the given engine is much reduced—.2, 1.4 and 2.7 inches of mercury at the given r.p.m., respectively, for a given engine and carburetor setting at full throttle. Because of this, use of the engine intake vacuum is feasible suitably to modify the resistance at engine loads above 80 percent and gain a greater engine load range in which the instant system is helpful.

In FIG. 3, arm 62 operates with the throttle valve 52 as is the case in FIG. 1, and the rheostat resistance curve bears approximate resemblance to the flow rate curve as before. At engine intake vacuum values greater than about five inches, the rheostat position is fixed and determined by the stop screw 72. With an increase in engine load to above 80 percent at any given speed, the vacuum in the cup element 84 lowers to a point below five inches of mercury and the rheostat body will rotate clockwise because of expansion of the spring 82. The resistance of the rheostat decreases accordingly and this vacuum compensation reduces the possible error in the reading of the meter 28 as to fuel mileage.

The lost-motion device of FIG. 4 may be used in place of the intake manifold vacuum expedient of FIG. 3 in order to compensate for a deviation of the rheostat resistance curve from what is desired above 80 percent engine load capacity. A shaft 94 is connected as to rotate with the throttle valve. Pinned to the shaft at 96 to rotate therewith is a cylinder 98 which is bored as at 100 rotatively to receive one end of shaft 102. The cylinder 98 has a cut out portion at one end in order to present a shoulder 104 for contacting a pin 106 projecting from the shaft 102. The latter is so connected to a rheostat as to increase the resistance thereof when the shafts are turned as indicated by the arrows in FIG. 4, and to decrease that resistance when the shafts are turned in the opposite direction. Projecting from the shaft 102 and spaced from the pin 106 is a pin 108. This pin is of such a length as to contact a pin 110 fixed to a support 112 under high engine load conditions. A coil spring 114 surrounds the cylinder 98 and connects the pins 96 and 106.

Assuming that a given engine is designed to operate at above 4000 r.p.m., the lost-motion device of FIG. 4 may be used to secure a fixed rheostat resistance at high engine load. This resistance is represented by the dotted line A in FIG. 5 and would serve to connect the reading of the instrument 28 (FIG. 1). The shaft 94 in FIG. 4 may be taken to be the shaft 14 or the shaft 18 of FIG. 1 as will be understood.

If a given engine is designed to operate at an average r.p.m. of 3000, the shaft 94 and also the pin 96 (FIG. 4) would rotate with the shaft 102 under most engine operating conditions. The drive would be through the spring 114 which holds the pin 106 against the shoulder 104. Under high engine loads, however, the throttle opening or throttle angle would be greater and the pin 110 would serve as a stop limiting the rheostat resistance to a value appropriate for that particular engine. Such value could be represented in FIG. 5 by a line parallel with and lower than the line A in the case of the 3000 r.p.m. engine referred to.

The drawings illustrate the throttle valve 12 or 52 as a part of or in a conduit leading from a carburetor, but it is obvious that the present invention may be practiced without the use of a carburetor as in fuel induction type engines. A unit fuel induction type of engine generally employs a throttle valve for the air and the angle of this valve may be the factor determining the amount of resistance effected in the rheostat. The particular zone in which the fuel is admitted to the air stream may be at either side of the throttle valve insofar as the present invention is concerned.

I claim:
1. A system for determining instantaneously and automatically the ratio of car speed with respect to fuel consumption rate of a vehicle propelled by an internal combustion engine, said system comprising means for generating in a circuit an electrical current corresponding with the vehicle speed, a rheostat in said circuit, a throttle valve for controlling the flow rate of a fuel being fed to said engine, said throttle valve and rheostat being connected for varying the resistance of the latter to said current substantially in accordance with a variance in the throttle valve position, means connected with said rheostat and operated by the intake manifold vacuum of said engine to reduce said resistance under high engine load conditions, and means for indicating the current flow through said circuit as an indication of the said ratio.

2. A system for determining the distance being traveled by a vehicle propelled by an engine per unit of fuel, which system comprises means for generating an electrical current in a circuit with a voltage corresponding wtih the vehicle speed, a resistance in said circuit, a throttle valve for controlling the flow rate of a fuel being fed to an internal combustion engine of said vehicle, means connecting said throttle valve and said resistance to vary the latter in accordance with the position of said throttle valve at 80 percent load on said engine, means for affecting said connecting means to reduce said resistance at above 80 percent load, and means for measuring the current flow through said resistance as an indication of said distance.

References Cited in the file of this patent
UNITED STATES PATENTS

| | | |
|---|---|---|
| 2,304,822 | Harrison et al. | Dec. 15, 1942 |
| 2,728,864 | Brancke | Dec. 27, 1955 |

FOREIGN PATENTS

| | | |
|---|---|---|
| 753,042 | Great Britain | July 18, 1956 |